United States Patent
Brodt et al.

(10) Patent No.: US 8,085,066 B2
(45) Date of Patent: Dec. 27, 2011

(54) XCP ON 2 CSI

(75) Inventors: Jeremy W. Brodt, Plano, TX (US);
Amit Choudhury, Plano, TX (US); Ben F. McCormick, II, Warsaw, IN (US)

(73) Assignee: Renesas Electronics America Inc., Santa Clara, CA (US)

( * ) Notice: Subject to any disclaimer, the term of this patent is extended or adjusted under 35 U.S.C. 154(b) by 78 days.

(21) Appl. No.: 12/582,757

(22) Filed: Oct. 21, 2009

(65) Prior Publication Data

US 2011/0090102 A1    Apr. 21, 2011

(51) Int. Cl.
*H03K 19/0175*    (2006.01)

(52) U.S. Cl. ............ 326/82; 326/83; 326/86; 326/87; 326/80; 375/312; 375/316; 375/257; 375/335; 341/100; 341/101

(58) Field of Classification Search .......... 341/100, 341/101; 375/312, 316, 257, 355; 326/82–89
See application file for complete search history.

(56) References Cited

U.S. PATENT DOCUMENTS

| | | | |
|---|---|---|---|
| 6,992,987 B2 * | 1/2006 | Kobayashi | 370/252 |
| 7,088,133 B2 * | 8/2006 | Lee et al. | 326/39 |
| 7,408,995 B2 * | 8/2008 | Segaram | 375/257 |
| 7,493,423 B2 * | 2/2009 | Shibata et al. | 710/21 |
| 7,593,470 B2 * | 9/2009 | Segaram | 375/257 |
| 7,649,204 B2 * | 1/2010 | Hirano et al. | 257/59 |
| 7,672,380 B2 * | 3/2010 | Ho et al. | 375/257 |
| 7,684,532 B2 * | 3/2010 | Aung et al. | 375/355 |
| 2005/0090215 A1 * | 4/2005 | Cheng et al. | 455/180.3 |
| 2008/0273647 A1 * | 11/2008 | Segaram | 375/371 |
| 2010/0027728 A1 * | 2/2010 | Sugita et al. | 375/354 |
| 2010/0085988 A1 * | 4/2010 | Fukuda | 370/480 |
| 2010/0287434 A1 * | 11/2010 | Fukuda | 714/746 |

* cited by examiner

*Primary Examiner* — Linh Nguyen
(74) *Attorney, Agent, or Firm* — Campbell Stephenson LLP

(57) ABSTRACT

A microprocessor control unit (MCU) is mounted on a printed circuit board. The MCU includes first and second clocked serial interface (CSI) circuits. The first CSI circuit is configured to serially transmit a first xCP packet to a first encoder circuit, which in turn is configured to generate an encoded first xCP packet as a function of the first xCP packet and a first clock signal. A first low voltage differential signal (LVDS) circuit is coupled to the first encoder circuit and configured to serially receive the encoded first xCP packet therefrom. The first LVDS circuit is configured to generate a first differential signal as a function of the encoded first xCP packet.

19 Claims, 4 Drawing Sheets

US 8,085,066 B2

XCP ON 2 CSI

BACKGROUND OF THE INVENTION

Microcontroller units (MCUs) are like small computers on single integrated circuits. MCUs typically consist of a central processing unit (CPU) and support devices such as crystal oscillators, I/O interfaces, program memory, etc. The CPU executes one or more programs stored in the program memory.

MCUs are designed for dedicated applications. For example, MCUs can be designed to control various components in automobiles such as fuel injectors, spark plugs, braking systems, transmissions, etc. The present invention will be described with reference to MCUs used in automobiles, it being understood the present invention should not be limited thereto.

Automobiles have sensors that generate signals, which represent or are subsequently processed to represent operational data such as wheel speed, gear speed, manifold pressure, throttle position, air temperature, oxygen levels, etc. MCUs process the operational data in accordance with one or more control programs to generate signals that control the various automobile components. In this closed loop manner, MCUs control ignition timing, variable valve timing, the level of boost maintained by a turbo charger, the quantity and timing of fuel injected into cylinders, gear shift points, etc.

MCU control programs are stored in memory, which may take form in flash, read/write memory, read-only, and/or other types. MCU control programs usually fit in the available on-chip program memory, since it would be costly to provide a system with external, memory. Depending on the device, the memory that stores the control program may be field-alterable flash or read-only memory.

SUMMARY OF THE INVENTION

An MCU is mounted on a printed circuit board. The MCU includes first and second clocked serial interface (CSI) circuits. The first CSI circuit is configured to serially transmit a first universal calibration protocol (xCP) packet to a first encoder circuit, which in turn is configured to generate an encoded first xCP packet as a function of the first xCP packet and a first clock signal. A first low voltage differential signal (LVDS) circuit is coupled to the first encoder circuit and configured to serially receive the encoded first xCP packet therefrom. The first LVDS circuit is configured to generate a first differential signal as a function of the encoded first xCP packet.

BRIEF DESCRIPTION OF THE DRAWINGS

The present invention may be better understood in its numerous objects, features, and advantages made apparent to those skilled in the art by referencing the accompanying drawings.

The use of the same reference symbols in different drawings indicates similar or identical items.

DETAILED DESCRIPTION

As noted automobile MCUs generate signals for controlling components (e.g., fuel injectors, spark plugs, braking systems, transmissions, etc.) in accordance with one or more control programs stored in their on-chip memory. A control program may take form in code or instructions that are executable by a CPU of the MCU.

MCU control programs are created and optimized over the course of a long development process. However since the same control program is typically used in different automobile models, the control program may need to satisfy different requirements. In other words, identical MCUs executing the same control program, but in different automobile models, may be required generate distinct control signals at different times even when the MCUs receive the same operational data (e.g., wheel speed, gear speed, manifold pressure, throttle position, air temperature, oxygen levels, etc). Control program parameters can be calibrated for each automobile to account for the difference in requirements.

Control programs operate according to control parameters, which can be read from on chip memory. Control parameters vary according to differences in automobile features or requirements. Thus, in controlling automobile brakes, control parameters for a program may differ for each automobile model due to differences in physical properties such as weight distribution. Or in controlling transmissions, control parameters that relate to gear shift points may differ to address differing fuel economy requirements. To accommodate differing automobile model requirements, control parameters are calibrated by engineers during field tests.

Engineers use measurement, calibration and diagnostic (MCD) tools during field tests of an automobile to calibrate control parameters, which are typically stored in a look-up table in MCU memory. There are almost limitless possible variations in the control parameters. Therefore, it usually takes some effort on the part of the engineer until a sufficiently good compromise is found between control parameters that optimize automobile fuel economy, stability, etc. Optimization can be accomplished by analyzing data acquired from MCU during field tests and subsequently adjusting control parameters stored in memory of MCU via an MCD tool. MCD tools may take form in, for example, specifically configured laptop computer systems that comprise a microprocessor and memory that stores instructions executable by the microprocessor.

Figure 1:
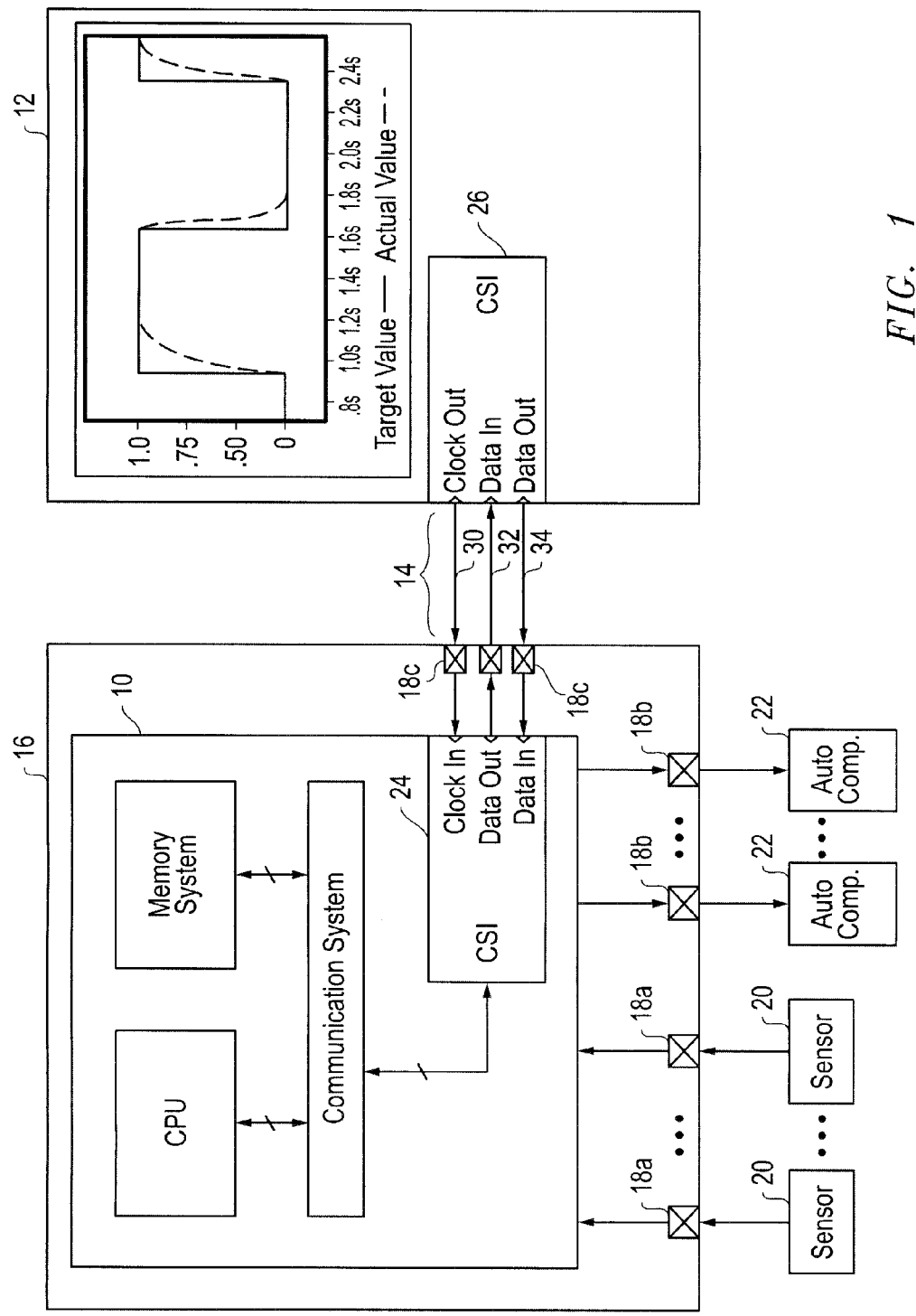
FIG. 1 illustrates in block diagram form an MCU coupled to a calibration tool via a communication channel.

FIG. 1 shows in block diagram form an example MCU 10 coupled to a MCD tool 12 via communication channel 14. The term coupled should not be limited to what is shown in FIG. 1. Two devices such as MCU 10 and MCD tool 12 can be coupled together via one or more intervening devices such as an encoder circuit and/or a low voltage differential signal circuit.

In the illustrated embodiment, MCU 10 is mounted on a printed circuit board (PCB) 16 along with other integrated circuits (not shown), and coupled together via conductive traces (not shown). PCB 16 includes I/O pins 18. MCU 10 receives signals from sensors 20 via I/O pins 18a. MCU 10 generates control signals that are subsequently transmitted to automobile components 22 (e.g., fuel injectors) via I/O pins 18b. I/O pins 18c are coupled to channel 14 and enable communication between MCU 10 and MCD tool 12.

MCU 10 includes a CPU coupled to a memory system and a clocked serial interface circuit via a communication system.

The memory system may include flash, read/write, read-only, and/or other types memory into which control programs, control program parameters, and other data may be stored and/or accessed. Although not shown the communication system may include many distinct components including, for example, crossbars, bridges, direct memory access controllers, etc., to facilitate data communication between the various components. For example, the communication system can transmit data packets between the clocked serial interface circuit and the CPU. The CPU of MCU 10 can create data packets in response to executing instructions stored in memory. Once created, the CPU can directly or indirectly transmit data packets to the clocked serial interface circuit for subsequent transfer to MCD tool 12. In the reverse direction, the CPU can directly or indirectly receive data packets from the clocked serial interface circuit and subsequently process the xCP packets in response to executing instructions stored in memory.

Channel 14 includes wires 30-34 for transmitting data or clock signals. Wires 30-34 are coupled between MCD tool 12 and respective I/O pin 18c on PCB 16 via ports located underneath a dashboard (not shown) of the automobile being field tested.

MCU 10 receives output signals from sensors 20 (e.g., temperature sensors, oxygen sensors, current sensors, etc.). If not in digital form, MCU converts the sensor signals into digital equivalents. The digital signals represent or are further processed to represent operational data such as gear speed, wheel speed, oxygen level, air temperature, etc. MCU 10 can process the operational data in accordance with one or more control programs stored in the MCU memory system to generate signals for controlling various automobile components 22.

MCD tool 12 can acquire (read) data from MCU 10 or write data to MCU 10 using standard communication protocols. Data acquired from MCU 10 may include, but is not limited to, operational data (e.g., gear speed), control program parameters, and/or control signals generated by MCU 10. Some data acquired from MCU 10 can be displayed on a monitor (not shown) of MCD tool 12 as a wave form. Viewing these wave forms, the development engineer can optimize control parameters in MCU memory via MCD tool 12 during field tests.

To minimize time and cost requirements for acquiring data and calibrating control parameters, engineers depend upon the CAN calibration protocol (CCP) that enables data transfer between MCUs and MCD tools. CCP was created in the 1990s at a time in which CAN was the only dominate networking system within automobile electronic systems. Since then, however, additional communication protocols such as FlexRay, LIN, etc., were devised with the continued development of automotive electronics. Since CCP's use was restricted to CAN networked applications, it increasingly encountered limitations in terms of its potential areas of use. This led to the development of CCP's successor, universal calibration protocol (xCP), which is capable of using the same protocol layer on different transport layers, and which operates independent of the network type used.

In general xCP communication occurs between master and slave devices via interface circuits that are coupled together by a communication channel such as communication channel 14 shown in FIG. 1. An xCP master device is capable of communicating with several xCP slave devices simultaneously. The present invention will be described with reference to a single master device (e.g., MCD tool 12) communicating with a single slave device (e.g., MCU 10) via interface circuits.

Figure 2:
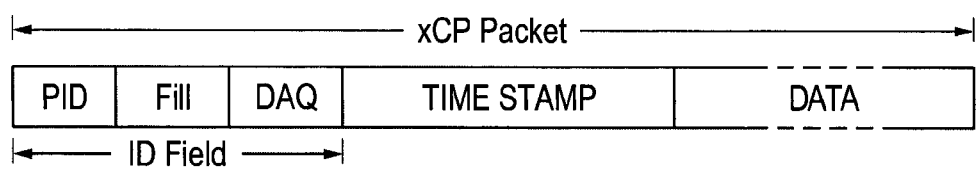
FIG. 2 illustrates a graphical representation of an example xCP packet format.

In xCP communication, data is transferred between devices (e.g., MCU 10 and MCD tool 12) via xCP packets. FIG. 2 illustrates an example xCP packet format. The xCP packet contains the generic part of the protocol, which is independent from the transport layer used. The xCP packet consists of an identification field, an optional time stamp field, and a data field. When exchanging xCP packets, a master device (e.g., MCD tool 12) and slave device (e.g., MCU 10) should be able to identify the type and contents of the data field. For this purpose, an xCP packet basically starts with an identification field, which contains the packet identifier (PID). An xCP packet may contain a time stamp field. An xCP packet finally contains a data field, which may contain packet payload data (e.g., control parameters, operational data, control signals, etc.).

MCD tool 12 communicates with the MCU 10 via communication channel 14 by exchanging xCP packets. In the example structure shown in FIG. 1, this communication occurs via clocked serial interface (CSI) circuit 24 and CSI circuit 26, each of which has a clock input or output, a data input, and a data output.

In general CSI circuits 24 and 26 communicate in full duplex mode. To begin a transfer of xCP packets, CSI circuit 26 configures a clock signal SCLK, using a frequency less than or equal to the maximum frequency that CSI circuit 24 can support. During each cycle of SCLK, a full duplex data transmission occurs. Namely with each rising edge of clock signal SCLK, which is sent to CSI circuit 24 via wire 30: CSI circuit 26 sends 1 bit of an xCP packet to the data input of CSI circuit 24 via wire 34; CSI circuit 24 reads the bit from wire 34; CSI circuit 24 sends 1 bit of another xCP packet to CSI circuit 26 via wire 32, and; CSI circuit 26 reads the bit from wire 32. This is one example of a data transmission that could be employed between MCUs and MCD tools, it being understood that other data transmission methods are contemplated.

Figure 3:
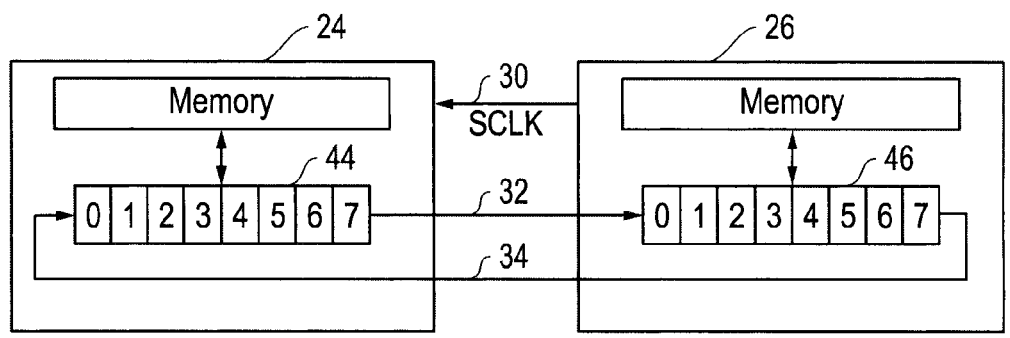
FIG. 3 illustrates examples of two such shift registers in block diagram form that are contained within respective CSI circuits.

Data transmission between CSI circuits normally involve two shift registers of some given word size, such as 8 bits. FIG. 3 illustrates two such shift registers 44 and 46 contained within CSI circuits 24 and circuit 26, respectively. These registers can be connected in a ring as shown. Data of an xCP packet to be transmitted out of register 46 is usually shifted out with the most significant bit first (i.e., bit "7"), while shifting in a new least significant bit of another xCP packet from register 44. After the 8-bit content of register 46 has been shifted out to register 44, CSI circuit 24 and 26 have exchanged their register values. Then each of CSI circuit 24 and 26 takes their register values and does something with it such as transferring it to local memory for storage until it can be retrieved by the CPU of MCU 10 or by a microprocessor in MCD tool 12. If there is more data to exchange, the shift registers 44 and 46 are then loaded with new 8-bit values from respective xCP packets and the process repeats. Data transmission between CSI circuits may involve any number of clock cycles. When there is no more data to be transmitted by CSI circuit 26, CSI circuit 26 stops toggling its clock SCLK.

Returning to FIG. 1, PCB 16 may be placed within an automobile at a position where physical access is difficult during field testing. For example, PCB 16 may be positioned deep within an engine block at a distance that is relatively far from the automobile passenger compartment where the engineer sits and calibrates control program parameters using his MCD tool 12. Given the physical separation between MCU 10 and MCD tool 12, communication channel 14 may be relatively long. Signals traveling over long wires may be adversely affected by noise, voltage drops, or interference The longer the wire, the more likely the signals are adversely affected. Moreover, communication between MCU 10 and MCD tool 12 via serial buses 30-34 is not necessarily independent; in many situations data (e.g., bits of one xCP packet) is sent to CSI circuit 26 only if CSI circuit 26 sends data (e.g., bits of another xCP packet) to CSI circuit 24.

Figure 4:
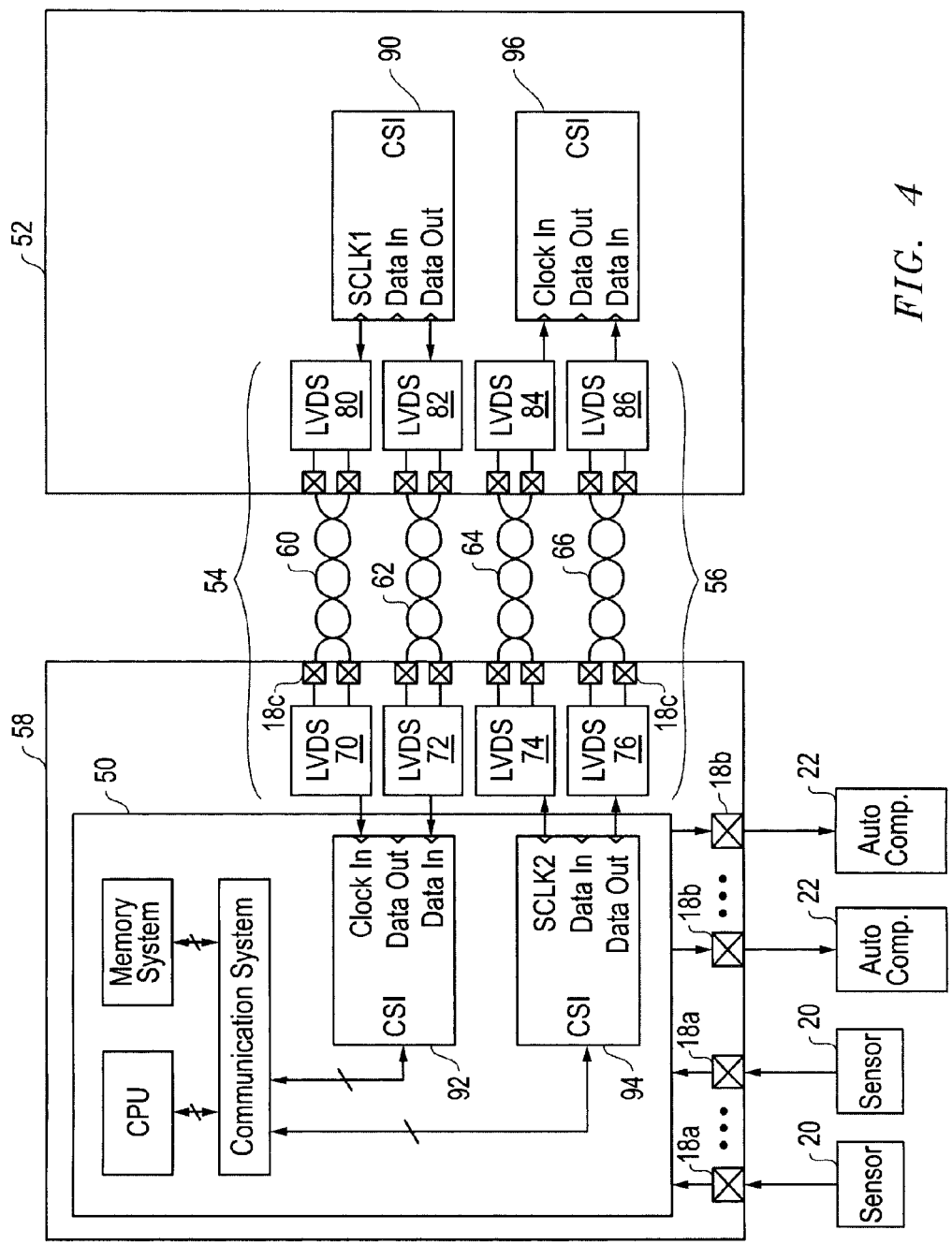
FIG. 4 illustrates in block diagram form another MCU coupled to a calibration tool via a communication channel.

FIG. 4 illustrates relevant components of an alternative embodiment that addresses the foregoing issues and others. FIG. 4 shows an MCU 50 coupled to an MCD tool 52 via communication channels 54 and 56. Like the MCU 10 of FIG. 1, MCU 50 is mounted on a PCB 58, which contains additional integrated circuits coupled together via traces. Also like MCU 10, MCU 50 receives output signals from sensors (e.g., temperature sensors, oxygen sensors, current sensors, etc.). If not in digital form, MCU 50 converts the signals into digital equivalents. The digital signals represent or are further processed to generate operational data that represents gear speed, wheel speed, oxygen level, temperature, etc. MCU 50 processes the operational data in accordance with one or more control programs stored in memory of MCU 10 to generate signals for controlling various automobile components (e.g., fuel injectors).

MCU 50 includes a CPU coupled to a memory system and CSI circuits via a communication system. The memory system may include flash, read/write, read-only, and/or other types memory into which control programs, control program parameters, and other data may be stored and/or accessed. Although not shown the communication system may include many distinct components including, for example, crossbars, bridges, direct memory access controllers, etc., to facilitate data communication between the various components. For example, the communication system can transmit xCP packets between the CSI circuits and the CPU. The CPU of MCU 50 can create xCP packets in response to executing instructions stored in memory. Once created, the CPU can directly or indirectly transmit xCP packets to one CSI circuit for subsequent transfer to MCD tool 52. In the reverse direction, the CPU can directly or indirectly receive xCP packets from another CSI circuit and subsequently process the xCP packets in response to executing instructions stored in memory.

Communication channel 54 includes twisted pairs of wires or conductors 60 and 62, and low voltage differential signal (LVDS) circuits 70, 72, 80, and 82. Similarly, communication channel 56 includes twisted pairs of wires 64 and 66, and low voltage differential signal (LVDS) circuits 74, 76, 84, and 86. Each of the twisted pairs of wires 60-66 may be coupled between an LVDS circuit of MCD tool and an LVDS circuit on PCB 58 via a dashboard port (not shown). In one embodiment, twisted pairs of wires 60 and 62 may be wholly or partly contained within a category 5 Ethernet cable. Likewise twisted pairs of wires 64 and 66 may be wholly or partly contained within another category 5 Ethernet cable. Category 5 Ethernet cables are well known and typically include multiple twisted pairs within a single jacket.

Each of the twisted pairs of conductors 60-66 is coupled between a respective pair of LVDS circuits as shown. In the illustrated embodiment, LVDS circuits 70-76 are mounted on PCB 58 and coupled to MCU 50 via respective traces, it being understood that the LVDS circuits could be integrated into the same substrate that contains MCU 50 in an alternative embodiment. FIG. 4 shows LVDS circuits 70-76 coupled to twisted pairs 60-66, respectively, via I/O pins and traces on PCB 58.

LVDS is an electrical signaling system that can run at very high speeds over an inexpensive twisted pair of wires. LVDS is a differential signaling system, which means it effectively transmits two different voltages which are compared at the receiver end. LVDS uses this difference in voltage between the two wires to encode information. The transmitter LVDS circuit injects a small current, typically 3.5 milliamps, into one wire or the other depending on the logic level to be sent. The current passes through a resistor of about 100 ohms at the receiver LVDS circuit, and then returns in the opposite direction along the other wire. This type of signaling is often referred to as current loop signaling.

With current at 3.5 milliamps the voltage difference across the resistor at the receiver LVDS circuit is around 350 millivolts. The receiver LVDS circuit senses the polarity of this voltage to determine the logic level. The small amplitude of the signal and the tight electric and magnetic field coupling between the two wires reduces the amount of radiated electromagnetic noise. A low differential voltage, about 350 millivolts as noted above, causes LVDS to consume very little power compared to other systems. LVDS is often used for serial data transmission, which involves sending data bit by bit.

Although twisted pairs of wires 60-66 are employed in the embodiment shown in FIG. 4, non-twisted pairs of wires could also be employed. With non-twisted pairs, however, electrical noise sources from the automobile or elsewhere may introduce signals into the conductors by coupling of electric or magnetic fields and tend to couple to both wires of a pair equally. The noise source thus produces a common-mode signal which is cancelled at the receiver when the difference signal is taken. This starts to fail when the noise source is close to the conductor pair; the closer wire will couple with the noise source more strongly and the common-mode rejection of the receiver will fail to eliminate it. Twisting the conductor pair counters this effect as on each half twist the wire nearest to the noise-source is exchanged. Providing the interfering source remains uniform, or nearly so, over the distance of a single twist, the induced noise will remain common-mode. The twist rate (i.e., the number of twists per unit length of conductor) may vary between twisted pair conductors 60-66 to reduce cross-talk therebetween.

The LVDS circuits 70-76 and 80-86 along with twisted pair conductors 60-66 are coupled between CSI circuits 90-96 as shown in FIG. 4. CSI circuits 90-96 may be similar or identical in structure to the CSI circuits 24 and 26 shown in FIG. 1 and described above. Like CSI circuits 24 and 26, each of CSI circuits 90-96 has a clock input or output, a data input, and a data output. CSI circuits 90-96, however, are employed differently when compared to the operation of CSI circuits 24 and 26. In the illustrated embodiment, the data input of CSI circuit 90, the data output of CSI circuit 92, the data input of CSI circuit 94, and the data output of CSI circuit 96 are uncoupled or left open. Since these inputs/outputs are uncoupled, bits of xCP packets can be serially transmitted from CSI circuit 90 to CSI circuit 92, but not from CIS circuit 92 to CSI circuit 90, and bits of xCP packets can be serially transmitted from CSI circuit 94 to CSI circuit 96, but not from CIS circuit 96 to CSI circuit 94. One advantage of the embodiment illustrated in FIG. 4 when compared to the embodiment shown in FIG. 1 is that bits of xCP packets can be transmitted independently between MCU 50 and MCD tool 52. In other words, bits of xCP packets can be transmitted from CSI circuit 90 to CSI circuit 92 via communication channel 54 independent of whether bits of xCP packets are transmitted from CSI circuit 94 to 96 via communication channel 56, and vice versa.

CSI circuits 90 and 94 are master to CSI circuits 92 and 96, respectively. CSI circuits 90 and 94 generate and send clock signals SCLK1 and SCLK2, respectively, to CSI circuits 92 and 96, respectively. In one embodiment, with each rising edge of clock signal SCLK1, which is sent to CSI circuit 92 via LVDS circuits 70 and 80, CSI circuit 90 sends 1 bit of an xCP packet to the data input of CSI circuit 92 via LVDS circuits 72 and 82, and CSI circuit 92 reads the bit. It is noted that in an alternative embodiment, xCP packet bits could be transmitted on the falling edge of the SCLK1.

CSI circuit 90 sends its clock signal SCLK1 to LVDS circuit 80 without delay relative to transmission of corresponding xCP packet bits so that LVDS circuit 82 receives a bit of an xCP packet at approximately the same time LVDS circuit 80 receives a rising edge (or falling edge) of clock signal SCLK1. LVDS circuits 80 and 82, in turn, encode the signals as described above for subsequent transmission to LVDS circuits 70 and 72, respectively, via twisted pairs 60 and 62, respectively. The LVDS circuits 70 and 72 receive and decode the LVDS encoded signals to reproduce the xCP packet bit and the SLCK1 clock signal, respectively, at approximately the same time. LVDS circuits 70 and 72 then send the decoded signals to clock input and data input, respectively, of CSI circuit 92 so that it receives the rising edge (or falling edge) of clock signal SCKL1 with each bit of an xCP packet.

Communication via channel 56 operates in a similar fashion. With each rising edge of clock signal SCLK2, which is sent to CSI circuit 96 via LVDS circuits 74 and 84, CSI circuit 94 sends 1 bit of an xCP packet to the data input of CSI circuit 96 via LVDS circuits 76 and 86, and CSI circuit 96 reads the bit. CSI circuit 94 sends its clock signal SCLK2 to LVDS circuit 74 without delay so that LVDS circuit 76 receives a bit of a xCP packet at approximately the same time LVDS circuit 74 receives a rising edge (or falling edge) of clock signal SCLK2. LVDS circuits 74 and 76, in turn, encode the signals they receive from CSI circuit 94 for subsequent transmission to LVDS circuits 84 and 86, respectively, via twisted pairs 64 and 66, respectively. The LVDS circuits 84 and 86 receive and decode the LVDS encoded signals to reproduce the xCP packet bit and the SLCK2 clock signal, respectively, at approximately the same time. LVDS circuits 84 and 86 then send the decoded signals to the clock input and data input, respectively, of CSI circuit 96 so that it receives the rising edge (or falling edge) of clock signal SCKL2 with each bit of the xCP packet.

Figure 5:
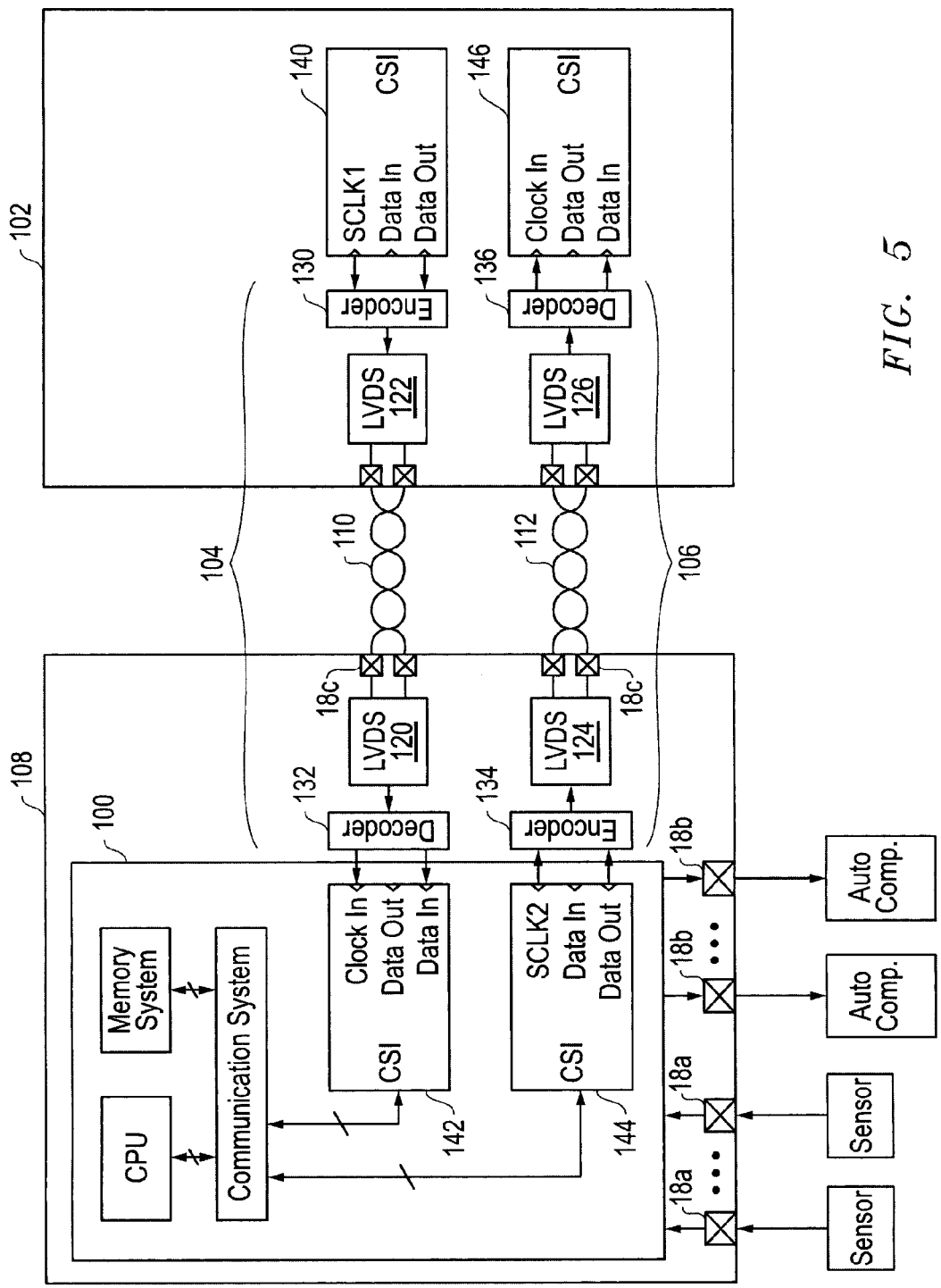
FIG. 5 illustrates in block diagram form still another MCU coupled to a calibration tool via a communication channel.

In FIG. 4 four twisted pairs of wires 60-66 are required to enable two-way independent communication of xCP packet bits between MCU 50 and MCD tool 52. For many automobile manufacturers, this may be an unreasonable number of twisted pairs of wires. FIG. 5 illustrates an alternative embodiment for enabling two-way independent communication between an MCU and MCD tool that uses fewer twisted pairs of wires. In this embodiment Manchester encoding is used in the communication channels between MCUs and MCD.

Manchester encoding is well known in the art. Manchester code is a line code in which the encoding of each bit has at least one transition and occupies the same time. Manchester encoding is a self clocking scheme. In telecommunications, a self-clocking signal is one that can be decoded without the need of a separate clock signal or other source of synchronization. This is usually done by including embedded synchronization information within the encoded signal, and adding constraints on the coding of the data such that false synchronization can easily be detected. Thus, because Manchester encoding is self clocking, a clock signal can be recovered from the Manchester encoded data. In Manchester encoding data bits are represented by transitions from one logical state to the other. This is different from the more common method of encoding, in which a bit is represented by either a high state such as 5 volt signal, or a low state such as 0 volt signal.

In Manchester encoding, the length of each data bit is set by default, which makes the signal self clocking. The state of a bit is determined according to direction of the transition. In some systems, the transition from low to high represents logical 1, and the transition from high to low represents logical 0. The chief advantage of Manchester encoding is the fact that the signal synchronizes itself. Each bit is transmitted in a fixed time (the period). A logical 0 is expressed by a low to high transition, and a logical 1 is represented by a high to low transition. The transitions which signify logical 0 or logical 1 occur at the midpoint of a period. A Manchester encoded signal contains frequent level transitions which allow the decoder to extract the clock signal using a Digital Phase Locked Loop (DPLL) circuit and correctly decode the value and timing of each bit. To allow reliable operation using a DPLL, the transmitted bit stream should contain a high density of bit transitions. Manchester encoding ensures this, allowing the decoder DPLL to correctly extract the clock signal.

FIG. 5 shows in block diagram form an MCU 100 coupled to an MCD tool 102 via communication channels 104 and 106. Like the MCU 10 of FIG. 1, MCU 100 is mounted on a PCB 108, which contains additional integrated circuits coupled together via PCB traces. Also like MCU 10, MCU 100 receives output signals from sensors (e.g., temperature sensors, oxygen sensors, current sensors, etc.). If not in digital form, MCU 100 converts the sensor signals into digital equivalents. The digital signals represent or are further processed to represent operational data such as gear speed, wheel speed, oxygen level, temperature, etc. MCU 100 can process the operational data in accordance with one or more control programs stored in MCU memory and generate signals for controlling various automobile components (e.g., fuel injectors).

MCU 100 includes a CPU coupled to a memory system and to CSI circuits via a communication system. The memory system may include flash, read/write, read-only, and/or other types memory into which control programs, control program parameters, and other data or information may be stored and/or accessed. Although not shown the communication system may include many distinct components including, for example, crossbars, bridges, direct memory access controllers, etc., to facilitate data communication between the various components. For example, the communication system can transmit xCP packets between the CSI circuits and the CPU. The CPU of MCU 100 can create xCP packets in response to executing instructions stored in memory. Once created, the CPU can directly or indirectly transmit xCP packets to one CSI circuit for subsequent transfer to MCD tool 102. In the reverse direction, the CPU can directly or indirectly receive xCP packets from another CSI circuit and subsequently process the xCP packets in response to executing instructions stored in memory.

Communication channel 104 includes a twisted pair of wires 110 coupled between LVDS circuits 120 and 122 via a dashboard port (not shown), the combination of which is coupled between Manchester encoder circuit 130 and Manchester decoder circuit 132 as shown. Similarly, communication channel 106 includes a twisted pair of wires 112 coupled between LVDS circuits 124 and 126 via a dashboard port (not shown), the combination of which is coupled between Manchester encoder circuit 134 and Manchester decoder circuit 136 as shown. In one embodiment, twisted pairs 110 and 112 may be wholly or partly contained in a category 5 Ethernet cable.

In the illustrated embodiment, decoder circuit 132 and encoder circuit 134 are mounted on PCB 108 and coupled to MCU 100 via PCB traces as shown. Further, LVDS circuits 120 and 124 are mounted on PCB 108 and coupled to decoder circuit 132 and encoder circuit 134, respectively, via PCB traces. In an alternative embodiment, LVDS circuit 120, LVDS circuit 124, decoder circuit 132, and encoder circuit 134 could all be integrated into the same substrate that contains MCU 100. FIG. 5 shows LVDS circuits 120 and 124 coupled to twisted pairs 110 and 112, respectively, via I/O pins and traces on PCB 108.

CSI circuits 140-146 operate in the same manner as CSI circuits 90-96, respectively, of FIG. 4. CSI circuits 140 and 144 generate clock signals SCLK1 and SCLK2, respectively, which are transmitted along with xCP packet bits to CSI circuits 142 and 146, respectively, via communication channels 104 and 106, respectively. With each rising edge of clock signal SCLK1, which is sent to CSI circuit 142 via communication channel 104, CSI circuit 140 sends 1 bit of an xCP packet, and CSI circuit 142 reads the bit. It is noted that in an alternative embodiment, xCP packet bits could be transmitted on the falling edge of the SCLK1. CSI circuit 140 concurrently sends its clock signal SCLK1 to Manchester encoder 130 so Manchester encoder 130 receives a bit of the xCP packet at approximately the same time Manchester encoder 130 receives a rising edge (or falling edge) of clock signal SCLK1. Manchester encoder 130, in turn, encodes SCLK1 and the xCP packet bit as described above, the result of which is subsequently transmitted to LVDS circuit 122, which in turn encodes the output of encoder circuit 130 for subsequent transmission to LVDS circuit 120 via twisted pair 110. LVDS 120 receives and decode the LVDS encoded signal, the output of which is provided to Manchester decoder 132 for decoding. Finally, decoder 132 outputs the xCP packet bit and clock signal SCLK1 to respective inputs of CSI circuit 142. CSI circuit 142 should receive the rising edge (or falling edge) of clock signal SCKL1 with each bit of an xCP packet.

Communication via channel 106 occurs in similar fashion. More particularly, with each rising edge of clock signal SCLK2 that is sent to CSI circuit 144 via communication channel 106, CSI circuit 144 sends 1 bit of an xCP packet, and CSI circuit 146 reads the bit. CSI circuit 144 concurrently sends its clock signal SCLK2 to Manchester encoder 134 so Manchester encoder 134 receives a bit of the xCP packet at approximately the same time Manchester encoder 134 receives a rising edge (or falling edge) of clock signal SCLK2. Manchester encoder 130, in turn, encodes the clock and packet bit signals it receives from CSI circuit 144, the result of which is transmitted to LVDS circuit 124, which in turn encodes the output of encoder circuit 134 for subsequent transmission to LVDS circuit 126 via twisted pair 112. LVDS 126 receives and decodes the LVDS encoded signal, the output of which is provided to Manchester decoder 136 for decoding. Finally, decoder 136 outputs the xCP packet bit and clock signal SCLK2 to respective inputs of CSI circuit 146. CSI circuit 146 should receive the rising edge (or falling edge) of clock signal SCKL2 with each bit of an xCP packet Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. An apparatus comprising:
   a data processing circuit configured to generate a first multibit value in response to the data processing circuit executing first instructions stored in memory;
   a first clocked serial interface (CSI) circuit coupled to the data processing circuit, the first CSI circuit comprising (1) a data output port for serially outputting the first multibit value, and (2) a clock output port for outputting a first clock signal;
   an encoder circuit comprising (1) a data input port coupled to the data output port of the first CSI circuit, (2) a clock input port coupled to the clock output port of the first CSI circuit, and (3) a data output port for outputting a first encoded signal, the encoder circuit configured to generate the first encoded signal as a function of the first clock signal and the first multibit value received from the first CSI circuit;
   a first low voltage differential signal (LVDS) circuit comprising (1) an input port coupled to the data output port of the encoder circuit, and (2) a pair of output ports for outputting a first differential signal, the first LVDS circuit configured to generate the first differential signal as a function of encoded signal received from the encoder circuit.

2. The apparatus of claim 1 further comprising:
   a second LVDS circuit comprising (1) a second pair of output ports for receiving a second differential signal, and (2) an output port;
   a decoder circuit comprising (1) a data input port coupled to the output port of the second LVDS circuit, (2) a clock output port, and (3) a data output port, the decoder circuit configured to generate a second clock signal and a second multibit value as a function of the second differential signal received from the second LVDS circuit;
   a second CSI circuit coupled to the data processing circuit, the second CSI circuit comprising (1) a data input port coupled to the data output port of the decoder circuit and configured to receive the second multibit value therefrom, and (2) a clock input port coupled to the clock output port of the decoder circuit and configured to receive the second clock signal therefrom.

3. The apparatus of claim 1 wherein the data processing circuit, the encoder circuit, and the first LVDS circuit are mounted on a printed circuit, which in turn is contained inside a transmission of an automobile.

4. The apparatus of claim 1 further comprising a memory for storing second instructions, wherein the data processing circuit is configured to generate a first xCP formatted packet in accordance with the second instructions, wherein the first xCP formatted packet comprises the first multibit value, and wherein the first CSI circuit serially outputs the first multibit value while it is contained in the first xCP formatted packet.

5. The apparatus of claim 2 further comprising a look-up table (LUT) in memory for storing multibit values, wherein the data processing circuit is configured to store the second multibit value in the LUT after the second multibit value is received by the second CSI circuit.

6. The apparatus of claim 2 wherein the first and second clock signals are independent of each other.

7. The apparatus of claim 6 wherein the first CSI circuit is configured to serially transmit the first multibit value to the encoder circuit before or after the second CSI circuit serially receives the second multibit value from the decoder circuit.

8. The apparatus of claim 2 further comprising:
   a third LVDS circuit comprising (1) a pair of input ports coupled to the pair of output ports, respectively, of the first LVDS circuit and configured to receive the first LVDS signal therefrom, and (2) an output port configured to output a second encoded signal, the third LVDS circuit configured to generate the second encoded signal as a function of the first LVDS signal;

a second decoder circuit comprising (1) an input coupled to the output of the third LVDS circuit, and (2) a pair of output ports for outputting a third clock signal and a third multibit value, wherein the second decoder circuit generates the third clock signal and the third multibit value as a function of the second LVDS signal;

wherein the third multibit value generated by the second decoder circuit is equivalent to the first multibit value received by the first encoder circuit.

9. The apparatus of claim 5 further comprising:

a sensor for generating an analog signal;

an analog to digital convertor for converting the analog signal into a multibit value for subsequent processing by the data processing circuit in accordance with second instructions stored in memory and in accordance with the second multibit value stored in the LUT.

10. An apparatus comprising:

a data processing circuit configured to generate a first universal calibration protocol (xCP) packet in response to executing instructions stored in memory;

a first clocked serial interface (CSI) circuit coupled to the data processing circuit and configured to serially transmit the first xCP packet to a first encoder circuit;

the first encoder circuit coupled to the first CSI circuit and configured to generate an encoded first xCP packet as a function of the first xCP packet and a first clock signal;

a first low voltage differential signal (LVDS) circuit coupled to the first encoder circuit and configured to serially receive the encoded first xCP packet therefrom, the first LVDS circuit configured to generate a first differential signal as a function of the encoded first xCP packet.

11. The apparatus of claim 10 further comprising:

a second LVDS circuit configured to generate an encoded second xCP packet in response to the second LVDS circuit receiving a second differential signal;

a first decoder circuit coupled to the second LVDS circuit and configured to serially receive the encoded second xCP packet, the first decoder circuit further configured to decode the encoded second xCP packet in order to generate a second xCP packet;

a second CSI circuit coupled to the first decoder circuit and the data processing circuit, the second CSI circuit configured to serially receive the second xCP packet from the first decoder.

12. The apparatus of claim 11 wherein:

the first CSI circuit is configured to transmit a first clock signal to the first encoder, and;

the first encoder is configured to generate the first encoded xCP packet as a function of the first clock signal and the first xCP packet.

13. The apparatus of claim 12 wherein:

the first encoder comprises a Manchester encoder, and;

the first decoder comprises a Manchester decoder.

14. The apparatus of claim 12 wherein:

the first CSI circuit is configured to transmit the first xCP packet and the first clock signal while the second CSI circuit is receiving the second xCP packet and a second clock signal, wherein the first and second clock signals are distinct.

15. The apparatus of claim 14 further comprising:

a look-up table in memory for storing multibit values;

wherein the second xCP packet comprises a multibit value;

wherein the data processing circuit is configured to store the multibit value in the look-up table in response to the data processing circuit processing the second xCP packet.

16. The apparatus of claim 15 further comprising:

an automobile transmission comprising one or more sensors that generate signals;

wherein the data processing circuit is configured to process digital representations of the sensor signals in accordance with instructions stored in memory and in accordance with one or more multibit values stored in the look-up table.

17. A method comprising:

a first clocked serial interface (CSI) circuit receiving a first universal calibration protocol (xCP) packet and serially outputting the first xCP packet to an encoder circuit;

the encoder circuit generating an encoded first xCP packet as a function of a first clock signal and the first xCP packet received from the first CSI circuit;

a first low voltage differential signal (LVDS) generating a first differential signal as a function of the first encoded xCP packet received from the encoder circuit.

18. The method of claim 17 further comprising:

a second LVDS circuit receiving a second differential signal;

the second LVDS circuit generating a second encoded signal as a function of the second differential signal;

a decoder circuit generating a second clock signal and a second multibit value as a function of the second encoded signal received from the second LVDS circuit.

19. The method of claim 18 wherein the first CSI circuit serially transmits the first xCP packet to the encoder circuit before or after the second CSI circuit serially receives the second multibit value from the decoder circuit.

* * * * *